United States Patent [19]

Mylari et al.

[11] 3,852,289

[45] Dec. 3, 1974

[54] SULFENYLATION OF N-ARYLHETEROCYCLIC COMPOUNDS

[75] Inventors: Banavara L. Mylari, Waterford; Thomas M. Brennan, Niantic, both of Conn.

[73] Assignee: Pfizer Inc., New York, N.Y.

[22] Filed: Mar. 20, 1973

[21] Appl. No.: 342,969

[52] U.S. Cl......... 260/248 AS, 424/249, 260/326 S, 260/578
[51] Int. Cl............................................ C07d 55/10
[58] Field of Search............................. 260/248 AS

[56] References Cited

UNITED STATES PATENTS 3,560,496  2/1971  Howes et al. ................... 260/248

*Primary Examiner*—John M. Ford
*Attorney, Agent, or Firm*—Connolly and Hutz

[57] ABSTRACT

A process for the sulfenylation of N-phenylheterocyclic congeners with p-chlorosulfenyl chloride in a reaction-inert solvent at about 25°–110° C., said products being useful as coccidiostats or as intermediates for the preparation thereof.

3 Claims, No Drawings

SULFENYLATION OF N-ARYLHETEROCYCLIC COMPOUNDS

BACKGROUND OF THE INVENTION

This invention relates to a process for the sulfenylation of aromatic compounds, and in particular to the preparation of compounds useful as coccidiostats or as intermediates leading to compounds having coccidiostatic activity.

Thiophenylation or sulfenylation of aromatic substrates employing sulfenyl halides has received limited attention in the chemical literature, *Synthesis*, 617 (1971). With the exception of the thiophenylation of such highly aromatic nuclei as naphthalene or anthracene, it is necessary to employ a Friedel-Crafts catalyst in order to effect such a reaction. Further, the products isolated from these reactions frequently contain equal or nearly equal amounts of various positional isomers, requiring extensive efforts to separate and purify the individual products.

SUMMARY OF THE INVENTION

It has now been discovered that the preparation of compounds of the formulae:

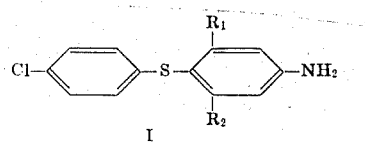

and

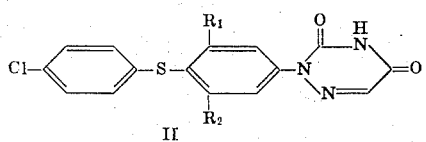

wherein $R_1$ is selected from the group consisting of methyl and hydrogen and $R_2$ is selected from the group consisting of methyl and chloro, which comprises, for the synthesis of compounds of formula I, contacting p-chlorophenylsulfenyl chloride with a compound of the formula:

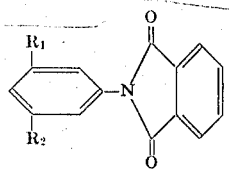

in the presence of a reaction-inert solvent at a temperature of 25°–110° C. and thereafter removing the phthaloyl group and for the synthesis of compounds of formula II, contacting p-chlorophenylsulfenyl chloride with a compound of the formula:

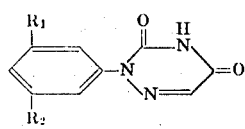

in a reaction-inert solvent at a temperature of 25°–110° C. leads to the desired products containing little, if any, undesired isomers and can be conducted without the use of a Friedel-Crafts catalyst.

A preferred feature for the process leading to the compounds of formula I is the use of hydrazine for the removal of the phthaloyl moiety.

DETAILED DESCRIPTION OF THE INVENTION

The aforementioned reaction is depicted in the following scheme

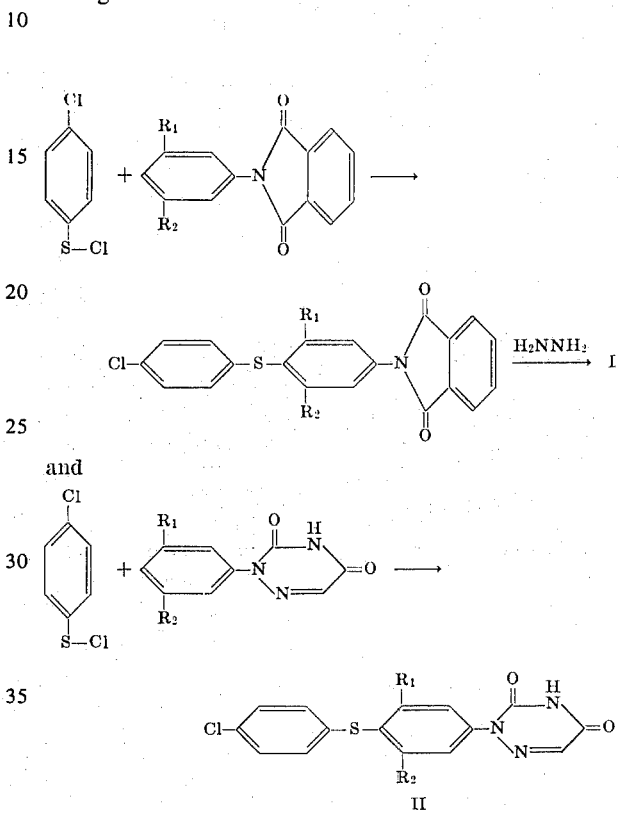

wherein $R_1$ and $R_2$ are as previously indicated.

In the above reaction of a sulfenyl chloride with the requisite N-arylphalimide or N-aryl-as-triazine-3,5(2H,4H)-diones, the theoretical ratio for said reaction is 1:1. In practice, it is frequently desired to employ a slight excess of 5–10% of the sulfenyl chloride to force the reaction to completion.

It is also desirable to conduct said reaction in a reaction-inert solvent. By such a solvent is contemplated those which, under the conditions of the instant process, do not enter into appreciable reaction with either the starting reagents or products. It is preferred that non-aqueous solvents be employed, although a very small amount of moisture is tolerable without markedly affecting the yields or purity of the resulting product. Suitable solvents or combinations thereof which are included in this group are nitroalkanes, chlorinated(lower)alkyl hydrocarbons, di(lower)alkylsulfoxides, alicyclic ethers, and di(lower)alkoxyalkanes. The preferred solvents for the present process invention are n-hexane, chloroform, carbon disulfide, ethylene dichloride, tetrahydrofuran, dimethoxyethane and dimethylsulfoxide.

As one skilled in the art can readily appreciate, the use of a solvent in the claimed process allows contact of all the reactants in a single phase. Said process also takes place to an appreciable extent when the reaction is conducted neat, i.e., without a solvent. The limitation under such conditions hinges on the solubility of the N-arylphthalimide or N-aryl-astriazine-3,5(2H,4H)-dione derivative in the p-chlorophenylsulfenyl chloride, which in turn is dependent on temperature, rate of solution and crystal characteristics. Since the outcome of the instant process is less predictable under these conditions, a solvent is preferred.

Reaction time is not critical and is inherently dependent on concentration, reaction temperature and reactivity of the starting materials. In general, when temperatures of 60°–80° C. are employed, the reaction of time will vary between 4–10 hours.

While the minimum temperature for the sulfenylation reaction is not critical, except that the reaction takes increasingly longer time periods for completion as the temperature is decreased, the maximum temperature is about 110° C., owing to thermal instability of the reactant p-chlorosulfenyl chloride at higher temperatures. Reaction rates dictate a preferred range of about 35°–80° C., with about 60°–80° C. most preferred.

As previously indicated, one of the unexpected features of the claimed process is the ease with the reaction of the sulfenyl chloride with the N-arylphthalimide and N-aryl-as-triazine-3,5(2H,4H)-dione derivatives proceeds without the need for a Friedel-Crafts catalyst. As one skilled in the art would predict, the claimed condensation also proceeds in the presence of such catalyst as well. Accordingly, the present invention contemplates the claimed process conducted with and without the use of a Friedel-Crafts catalyst. All such catalyst are useful in the present invention. Typical examples of such catalyst include aluminum chloride, iron powder, zinc chloride, stannic chloride, ferric chloride and boron trifluoride. When one or more of said catalysts are employed, an amount equivalent to 0.002 to 0.1 mole of catalyst is used per mole of starting p-chlorophenylsulfenyl chloride.

At the conclusion of the sulfenylation reaction, the product is filtered from the reaction mixture or, alternately, the solvent is removed and the residual intermediate product triturated with water or an organic solvent or solvent combination in which it has diminished solubility. Further purification is achieved by recrystallization from an appropriate solvent, although it is advantageous at times to carry the intermediate leading to I into the next reaction as the crude product.

Removal of the phthaloyl group leads to the formation of an aminodiaryl sulfide, I, a class of compounds which, as previously mentioned, are useful as intermediates in the formation of coccidiostats. Although the phthaloyl group can be removed by heating with either an inorganic acid such as hydrochloric acid, hydrobromic acid, sulfuric acid, etc., or a base selected from the alkali metal or alkaline earth metal hydroxides, the preferred method for removal utilizes a refluxing solution of ethanol containing an equivalent amount, plus as much as a 10–15% excess, of hydrazine, as taught by Ing., et al., J. Chem. Soc., 2348 (1926) and Boissonnas, Advances in Org. Chem., 3, 182 (1963).

The products of the present invention of formula II are claimed in Belgium Patent No. 773583, wherein it is taught how to use the triazine products in controlling coccidiosis, a protozoan infection in young poultry.

The products of the present process of formula I are useful intermediates in the preparation of these coccidiostats by an alternate synethetic method; this preparative scheme is taught in the aforementioned Belgium patent and is shown as follows:

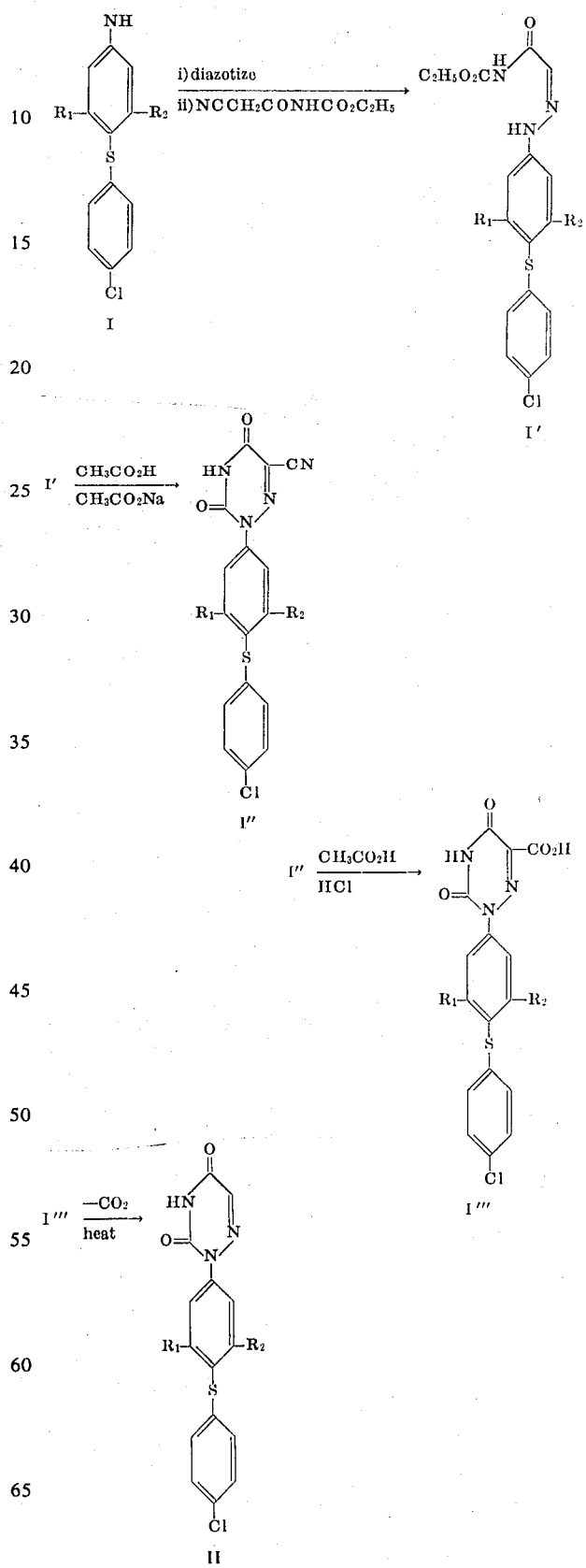

The examples which follow are given by way of illustration, and are not to be construed as limitations of this invention, many variations of which are possible within the scope and spirit thereof.

EXAMPLE 1

4-Amino-4'-chloro-2,6-dimethyldiphenyl sulfide (I: $R_1$, $R_2 = CH_3$)

A. N-Phthaloyl-3,5-xylidine

A mixture of 4.84 g. (0.04 mole) of 3,5-xylidine and 5.92 g. (0.04 mole) of phthalic anhydride is heated under a nitrogen atmosphere at 180° C. for 2 hrs. The reaction mixture is cooled and the solidified product recrystallized from acetic acid - water, 9.67 g., m.p. 130°–132° C.

B. 4-Phthalimido-4'-chloro-2,6-dimethyldiphenyl sulfide

To a solution of 4.32 g. (16.5 m moles) of N-phthaloyl-3,5-xylidine and 220 mg. (1.65 m moles) of aluminum chloride in 30 ml. of nitromethane is added 2.97 g. (16.5 m moles) of p-chlorophenylsulfenyl chloride over a period of 15 min. The resulting reaction mixture is allowed to stir at room temperature for 2 hrs., after which an additional 1.5 g. of sulfenyl chloride is added and stirring continued for 1.5 hrs. The mixture is subsequently diluted with methylene chloride and washed with water. The organic phase is dried over sodium sulfate and concentrated to dryness in vacuo. The crude intermediate, 8.0 g., is employed in the next reaction without further purification.

C. 4-Amino-4'-chloro-2,6-dimethyldiphenyl sulfide

To 8.0 g. of the above crude 4-phthalamido-4'-chloro-2,6-dimethyldiphenyl sulfide is added 530 mg. (16.5 m moles) of hydrazine hydrate in 20 ml. of ethanol and the mixture heated under reflux for 2 hrs. The mixture is diluted with 50 ml. of methylene chloride and the precipitated phthalyl hydrazide is filtered. Sulfuric acid (20 ml., 50 percent) is added to the filtrate, and the precipitated amine sulfate salt is filtered, washed with water and subsequently treated with a 10% potassium hydroxide solution. The liberated base is filtered and dried, 3.18 g., m.p. 158°–159° C. Gas-liquid chromatography indicates the purity of the desired product to be 98%.

EXAMPLE 2

The procedure of Example 1 is employed, with the exception that the aluminum chloride catalyst is omitted, to provide the desired product in a comparable yield of similar purity.

EXAMPLE 3

Employing the general procedure of Examples 1-2 and starting with the requisite aniline and indicated catalyst, the following useful aminodiaryl sulfides are prepared:

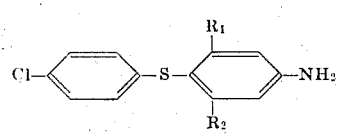

| $R_1$ | $R_2$ | Catalyst |
|---|---|---|
| H | $CH_3$ | none |
| H | $CH_3$ | $BF_3$ |
| H | $CH_3$ | $AlCl_3$ |
| $CH_3$ | $CH_3$ | $BF_3$ |
| $CH_3$ | $CH_3$ | $FeCl_3$ |
| $CH_3$ | $CH_3$ | Fe powder |
| H | Cl | none |
| H | Cl | $SnCl_4$ |
| H | Cl | $AlCl_3$ |
| H | Cl | $BF_3$ |
| $CH_3$ | Cl | $SnCl_4$ |
| $CH_3$ | Cl | Fe powder |
| $CH_3$ | Cl | $AlCl_3$ |
| $CH_3$ | Cl | none |
| $CH_3$ | Cl | $ZnCl_2$ |

EXAMPLE 4

2-[3,5-Dimethyl-4-(p-chlorophenylthio)phenyl]-1,2,4-triazine-3,5(2H,4H)-dione
(II: $R_1$, $R_2 = CH_3$)

To a solution of 1.0 g. (4.62 m moles) of 2-(3,5-dimethylphenyl)-1,2,4-triazine(2H,4H)-dione in 50 ml. of methylene chloride is added 121 mg. (0.46 m mole) of stannic chloride followed by 828 mg. (4.62 m moles) of p-chlorophenylsulfenyl chloride and the reaction mixture allowed to stir at room temperature for 2 hrs. An additional 828 mg. of sulfenyl chloride is added and the mixture allowed to stir overnight. The reaction is diluted with additional methylene chloride, washed successively with dilute hydrochloric acid and water, and subsequently dried over magnesium sulfate. The residue, which remains after the solvent is removed, is applied to a chromatographing column containing 50 g. of silica gel and is eluted with carbon tetrachloride until all the bis(p-chlorophenyl)disulfide is removed. The desired crude product is eluted from the column with methanol, 1.6 g. Further purification is carried out by thick-layer chromatography on silica gel using a hexanebenzene-acetic acid system (5:20:1) wherein the desired product, which has an Rf of 0.37, is eluted from the silica gel with methanol, m.p. 134°–136° C.

EXAMPLE 5

Starting with the appropriate reactants and repeating the procedure of Example 4, the following congeners are prepared:

| $R_1$ | $R_2$ | Catalyst |
|---|---|---|
| H | $CH_3$ | $BF_3$ |
| H | $CH_3$ | none |
| H | $CH_3$ | $AlCl_3$ |
| H | $CH_3$ | Fe powder |
| $CH_3$ | $CH_3$ | $BF_3$ |
| $CH_3$ | $CH_3$ | $AlCl_3$ |
| $CH_3$ | $CH_3$ | none |
| $CH_3$ | $CH_3$ | $FeCl_3$ |
| $CH_3$ | $CH_3$ | $ZnCl_2$ |
| H | Cl | none |
| H | Cl | $SnCl_4$ |
| H | Cl | $FeCl_3$ |
| H | Cl | $ZnCl_2$ |
| H | Cl | $BF_3$ |
| $CH_3$ | Cl | $BF_3$ |
| $CH_3$ | Cl | none |
| $CH_3$ | Cl | $ZnCl_2$ |
| $CH_3$ | Cl | Fe powder |
| $CH_3$ | Cl | $FeCl_3$ |

Preparation A

2-Aryl-1,2,4-triazine-3,5(2H,4H)-diones

I. Arylhydrazones of glyoxylamide 1. 3,5-dimethylphenylhydrazone of glyoxalamide a. 3,5-dimethylphenylhydrazone of ethyl cyanoglyoxylate To a solution of 10 g. of 3,5-dimethylaniline and 16.5 ml. of 12N hydrochloric acid in 75 ml. of water cooled to 10° C. is added dropwise a solution of 6.3 g. of sodium nitrite in 25 ml. of water. The resulting clear orange solution is added at 10°–15° C. to 12.2 g. of ethyl cyanoacetate and 16.4 g. of sodium acetate in 100 ml. of ethanol, and after 30 min. of stirring is diluted with water and filtered. The crude product, m.p. 118°–120° C., is employed in subsequent reactions without further purification.

b. 3,5-dimethylphenylhydrazone of glyoxylamide

A solution of 5.0 g. of the 3,5-dimethylphenylhydrazone of ethyl cyanoglyoxylate and 2.3 g. of potassium hydroxide in 70 ml. of water is heated at reflux temperature for 30 min. Water (70 ml.) is added to the resulting suspension. The solid is filtered from the cooled reaction mixture and dried, m.p. 205°–207° C.

2. Employing the procedures of Preparation A-I-1a and -b and starting with the requisite anilines, the following intermediates are synthesized:

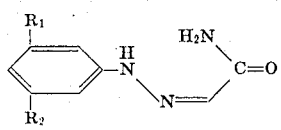

| $R_1$ | $R_2$ |
|---|---|
| $CH_3$ | Cl |
| H | Cl |
| H | $CH_3$ |

II. 2-Phenyl-1,2,4-triazine-3,5(2H,4H)-diones 1. 3,5-dimethylphenyl-1,2,4-triazine-3,5(2H,4H)-diones To a suspension of 230 mg. of 55% sodium hydride-oil mixture in 740 mg. of diethyl carbonate is added 300 mg. of the 3,5-dimethylphenylhydrazone of glyoxylamide in 15 ml. of absolute ethanol, and the reaction mixture heated under reflux for 1 hr. The reaction is quenched with water and extracted with diethyl ether. The ether layer is extracted with 10 percent potassium hydroxide and the aqueous layer separated, acidified with 12N hydrochloric acid and the liberated product extracted with fresh ether. The organic phase is dried over sodium sulfate and concentrated to dryness in vacuo, 260 mg., m.p. 155°–160° C. Recrystallization from ethyl acetate-hexane gave the purified intermediate, m.p. 165°–167° C.

2. Starting with the intermediates from Preparation A-I-2 and employing the procedure of Preparation A-II-1, the following analogs are prepared:

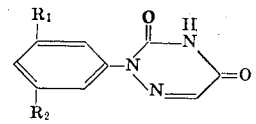

| $R_1$ | $R_2$ |
|---|---|
| $CH_3$ | Cl |
| H | Cl |
| H | $CH_3$ |

What is claimed is:

1. A process for the preparation of compound of the formula:

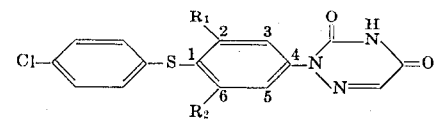

wherein $R_1$ is selected from the group consisting of methyl and hydrogen; and $R_2$ is selected from the group consisting of methyl and chloro, which comprises contacting p-chlorosulfenyl chloride with a compound of the formula:

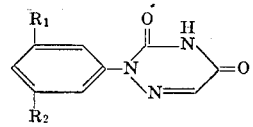

in the presence of a reaction-inert solvent at a temperature of 25–110° C.

2. The process of claim 1 wherein $R_1$ and $R_2$ are each methyl.

3. The process of claim 1 wherein $R_1$ is methyl and $R_2$ is chloro.

* * * * *